(12) United States Patent
Fang

(10) Patent No.: US 10,478,767 B2
(45) Date of Patent: Nov. 19, 2019

(54) AIR PURIFICATION METHODOLOGY AND APPARATUS

(71) Applicant: Yi Fang, Dallas, TX (US)

(72) Inventor: Yi Fang, Dallas, TX (US)

(73) Assignee: Yi Fang, Dallas, TX (US)

( * ) Notice: Subject to any disclaimer, the term of this patent is extended or adjusted under 35 U.S.C. 154(b) by 214 days.

(21) Appl. No.: 15/436,744

(22) Filed: Feb. 17, 2017

(65) Prior Publication Data

US 2018/0221806 A1    Aug. 9, 2018

Related U.S. Application Data

(60) Provisional application No. 62/388,247, filed on Jan. 27, 2016.

(51) Int. Cl.
*B01D 47/02* (2006.01)

(52) U.S. Cl.
CPC .................. *B01D 47/021* (2013.01)

(58) Field of Classification Search
USPC .......... 95/226; 261/77, 123; 96/351
See application file for complete search history.

(56) References Cited

U.S. PATENT DOCUMENTS

| | | | | |
|---|---|---|---|---|
| 2,138,153 A | * | 11/1938 | Grisdale | B01D 47/021 422/180 |
| 3,768,981 A | * | 10/1973 | Alliger | B01D 53/925 261/122.1 |
| 4,300,924 A | * | 11/1981 | Coyle | F01N 3/04 261/123 |
| 7,192,469 B1 | * | 3/2007 | Rumell | B01D 45/08 55/DIG. 30 |
| 8,425,665 B2 | * | 4/2013 | Duesel, Jr. | B01D 53/18 422/168 |
| 8,601,800 B2 | * | 12/2013 | Ojima | F01N 3/04 60/279 |

* cited by examiner

*Primary Examiner* — Nina Bhat
(74) *Attorney, Agent, or Firm* — Yi Fang

(57) ABSTRACT

A method of air purification and apparatus uses thorough air-bath to trap airborne debris and gaseous molecules in the liquid. Incoming air are reduced repeatedly and thoroughly at various stages into tiny air bubbles in contact with liquid in the apparatus where airborne materials and gaseous molecules are trapped in the liquid. This cleaning system can effectively remove small or large airborne debris and gaseous molecules, in contrast to cleaning effectiveness limited by the filter pore sizes in traditional filter system. The liquid can be water, water mixed with any designed substances or other type of liquid phase of materials. In exemplary case, water is used as a part of filtration medium, the apparatus thus can be served as both air purifier and humidifier. A relatively high humidity in the air would help to trap more airborne debris, which makes the air purification apparatus more efficient.

18 Claims, 13 Drawing Sheets

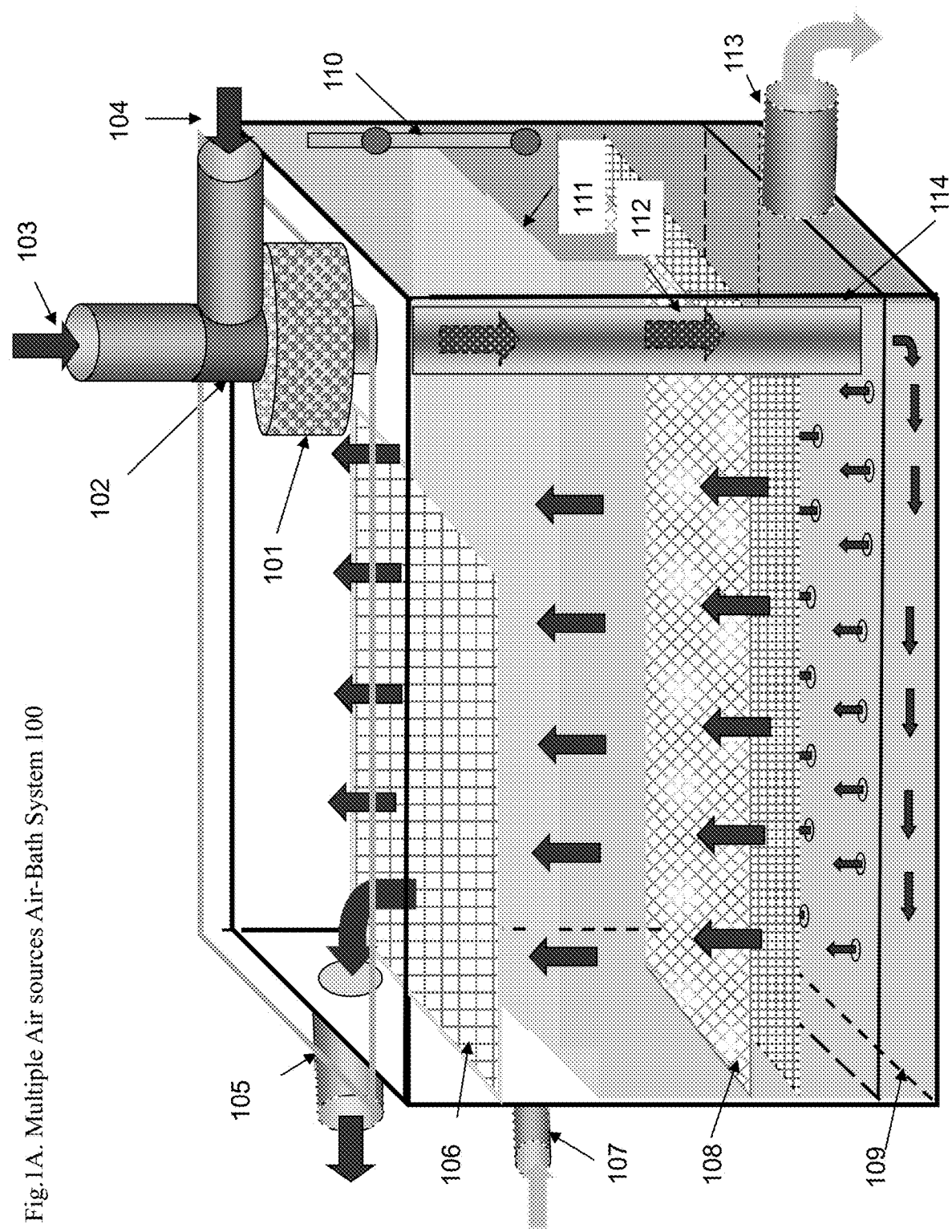
Fig.1A. Multiple Air sources Air-Bath System 100

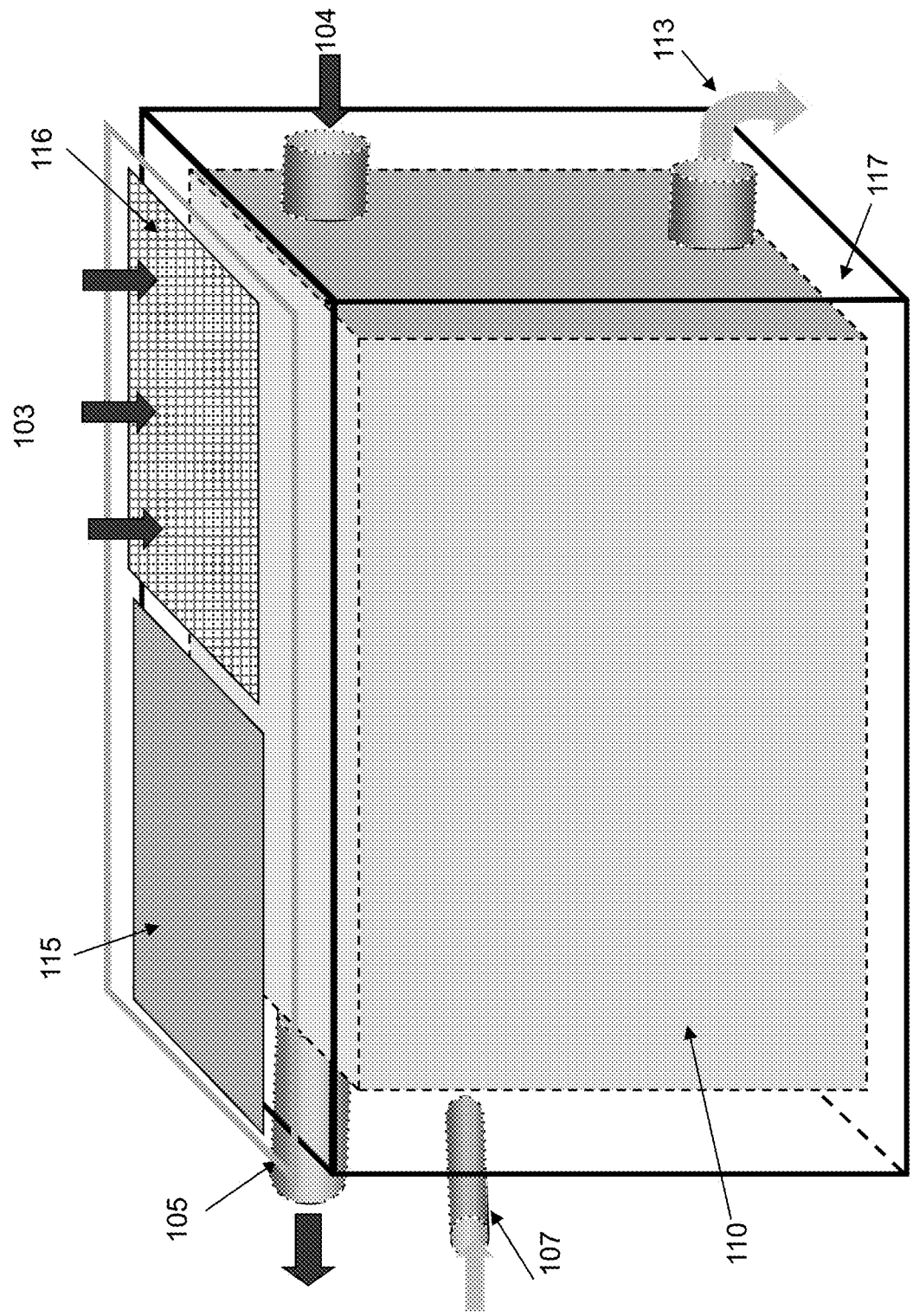
Fig. 1B. Housing of Multiple Air sources Air-Bath System 100

Fig. 2 Air Crush System 108
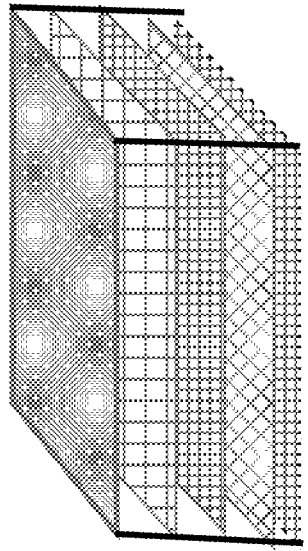
a. Porous material 201
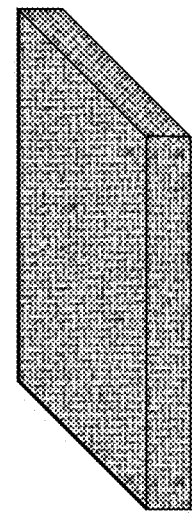
b. Series of mesh screen Stack System 202
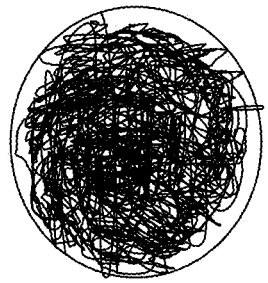
c. Random fine wire stack System 203

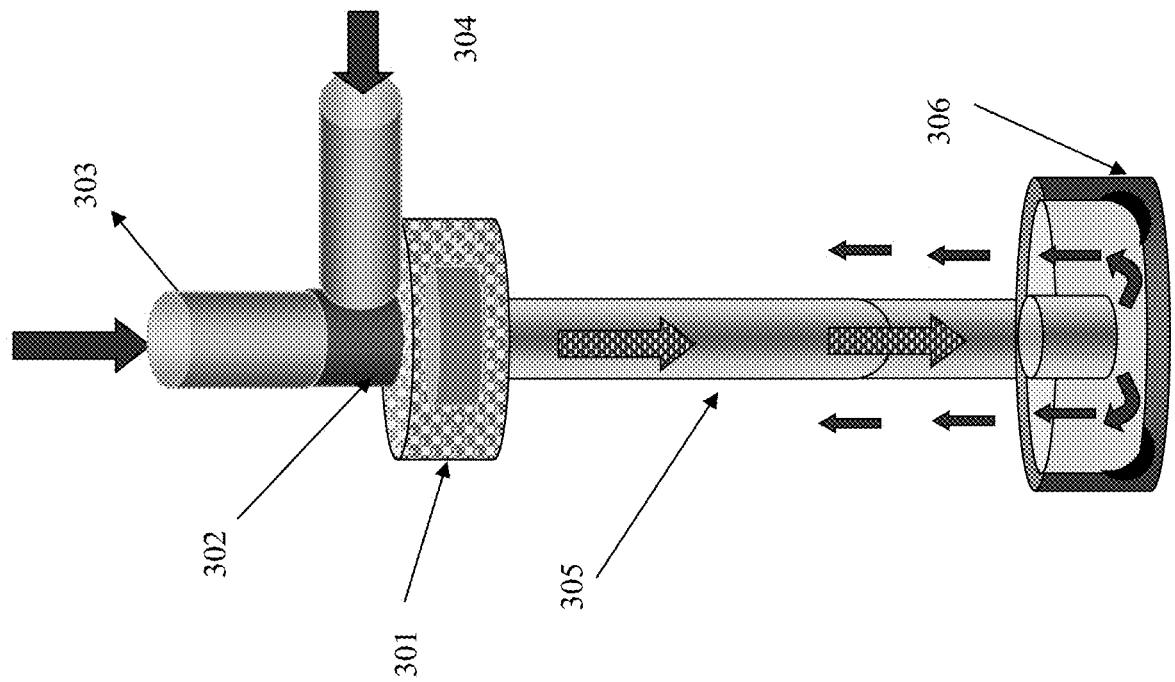
Fig. 3A Centralized Air Distribution 300

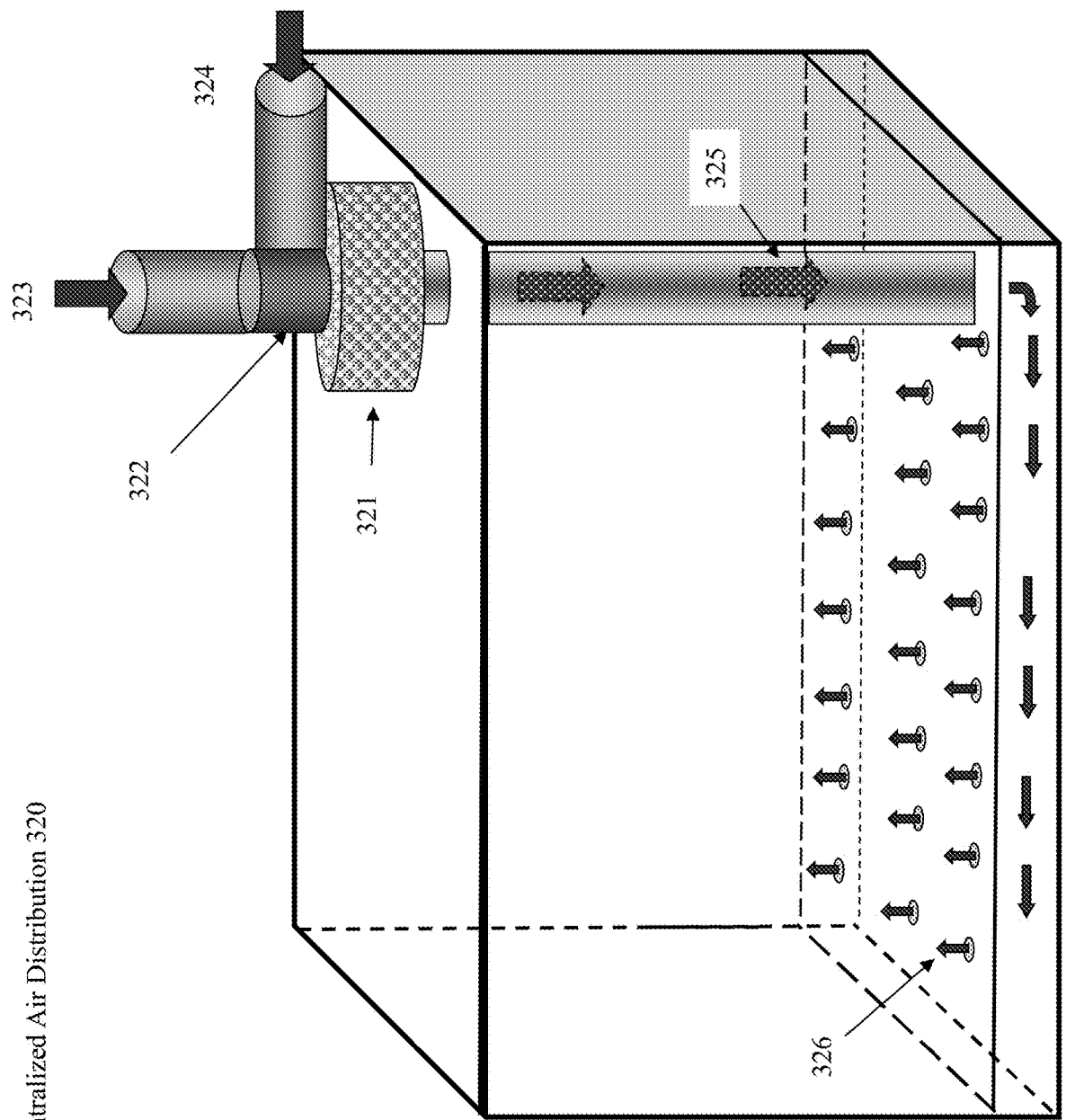
Fig. 3B Decentralized Air Distribution 320

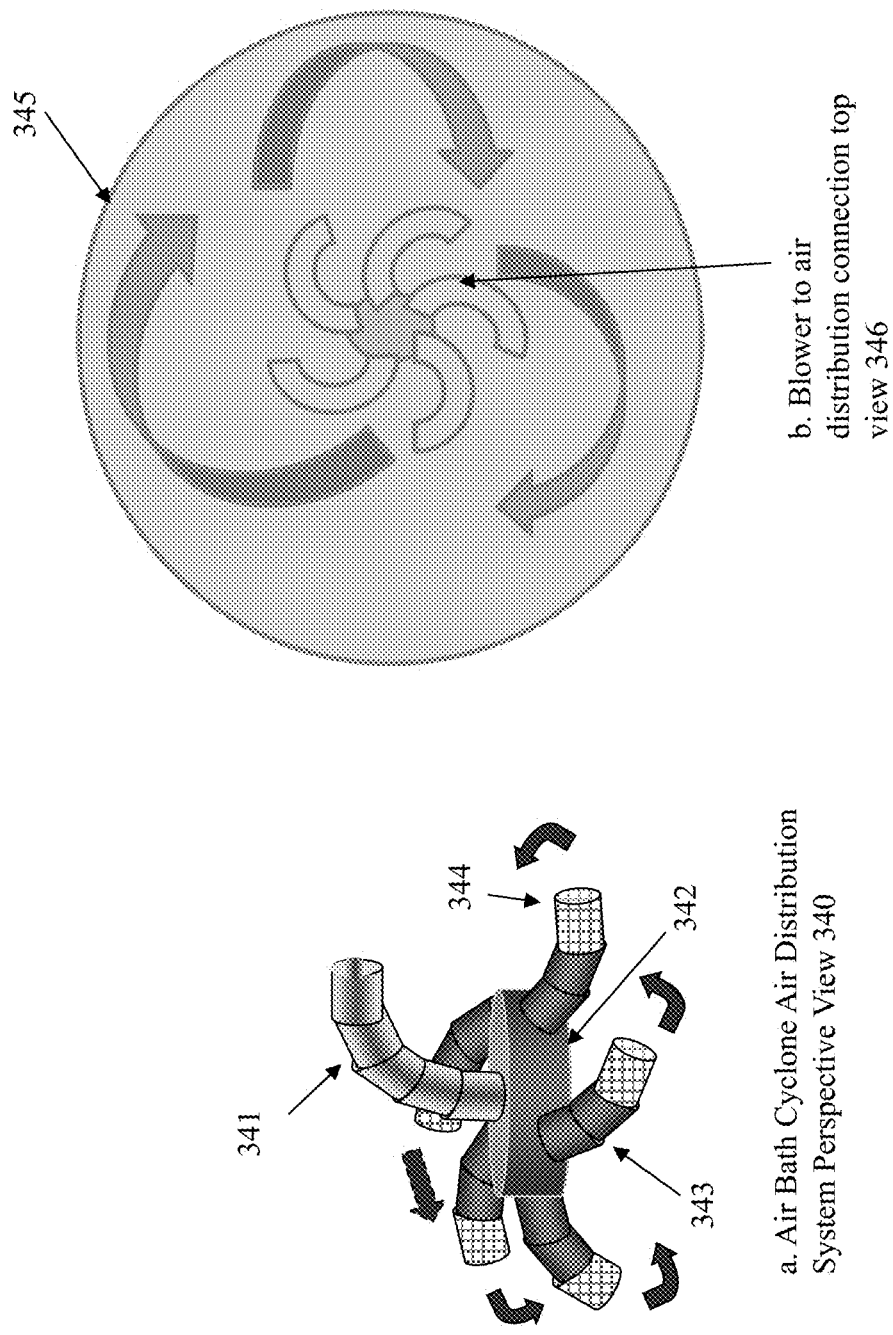
Fig. 3C Cyclone Air Distribution System 340

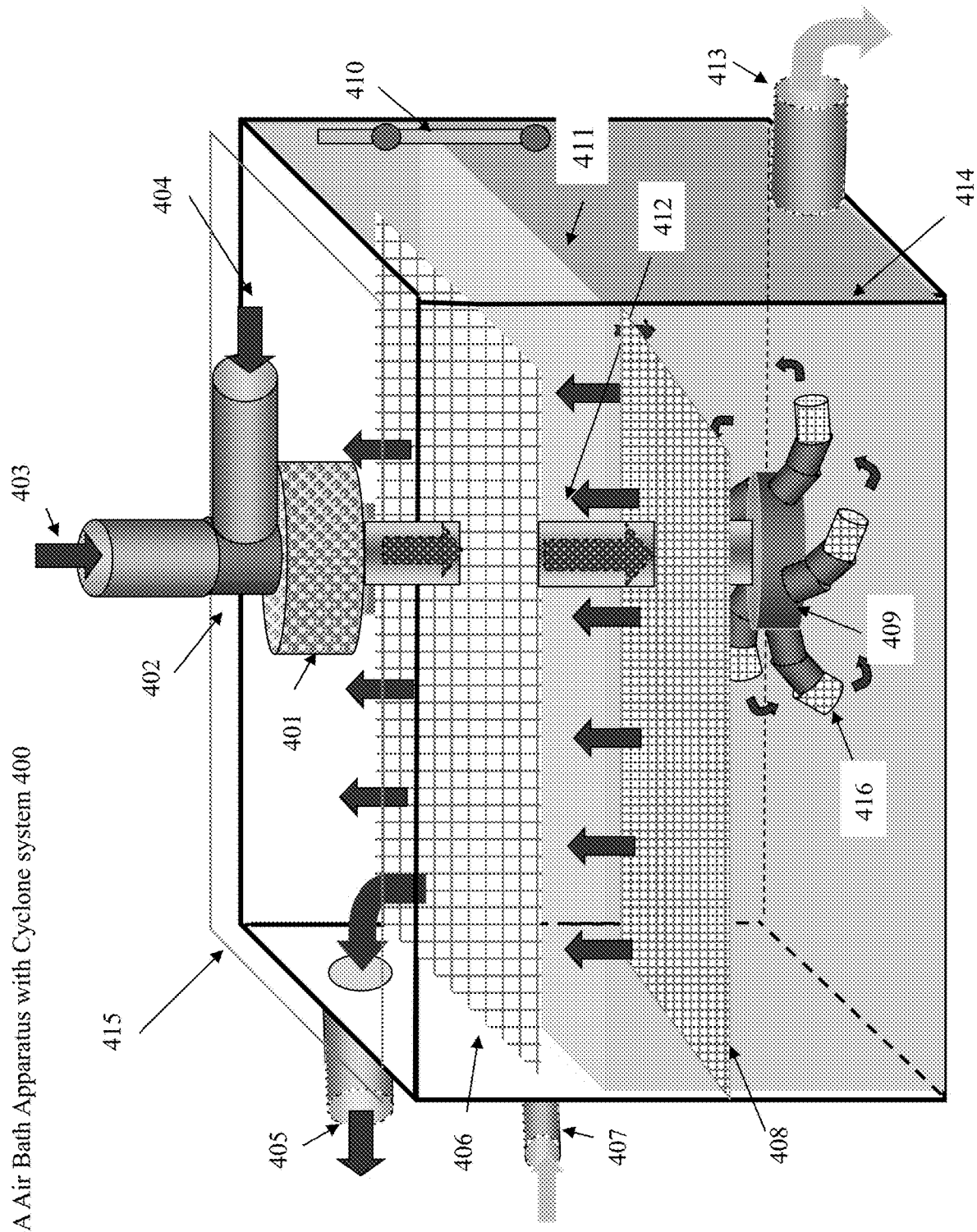
Fig. 4A Air Bath Apparatus with Cyclone system 400

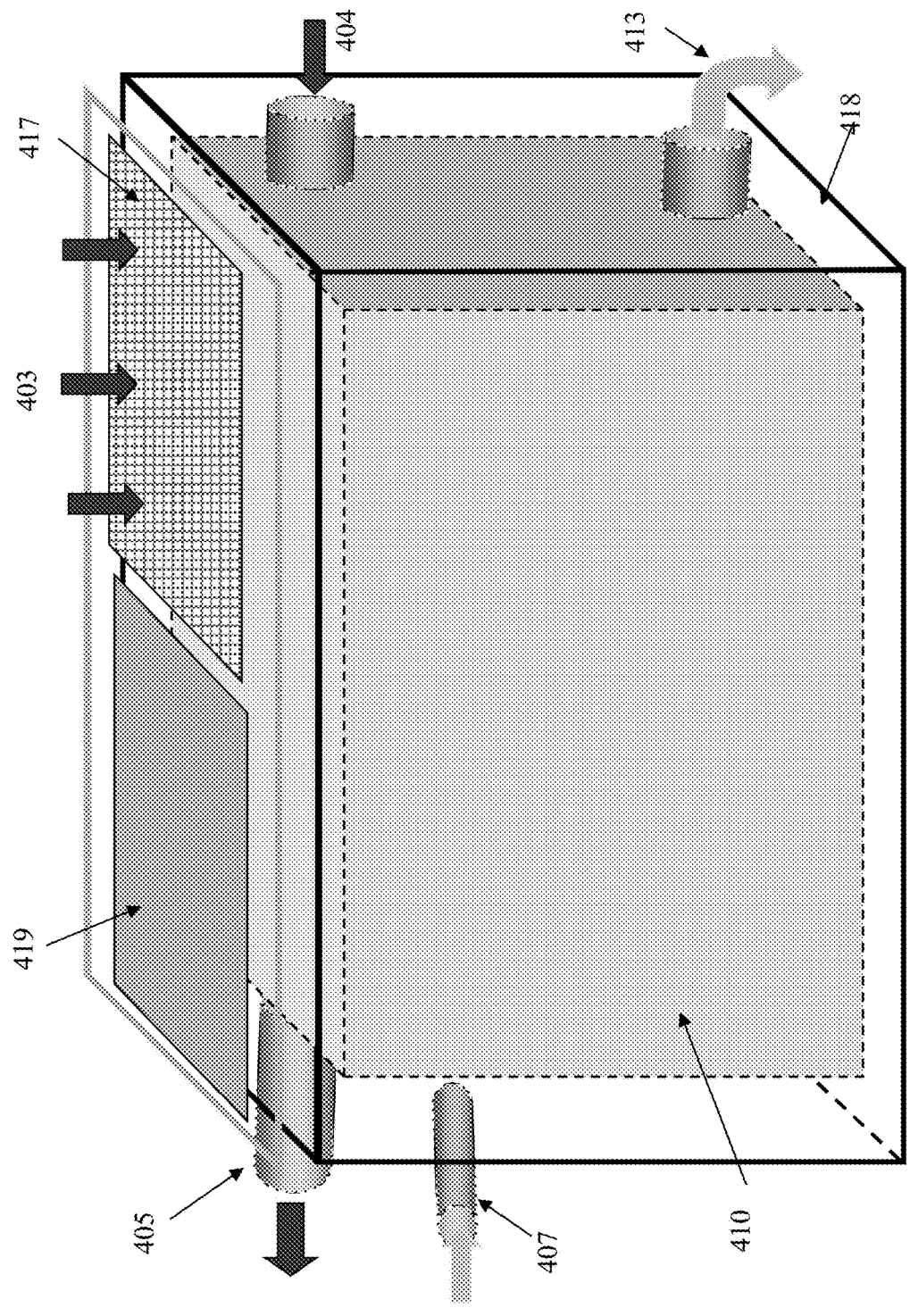
Fig.4B. Housing of Multiple Air Sources Air-Bath System 400

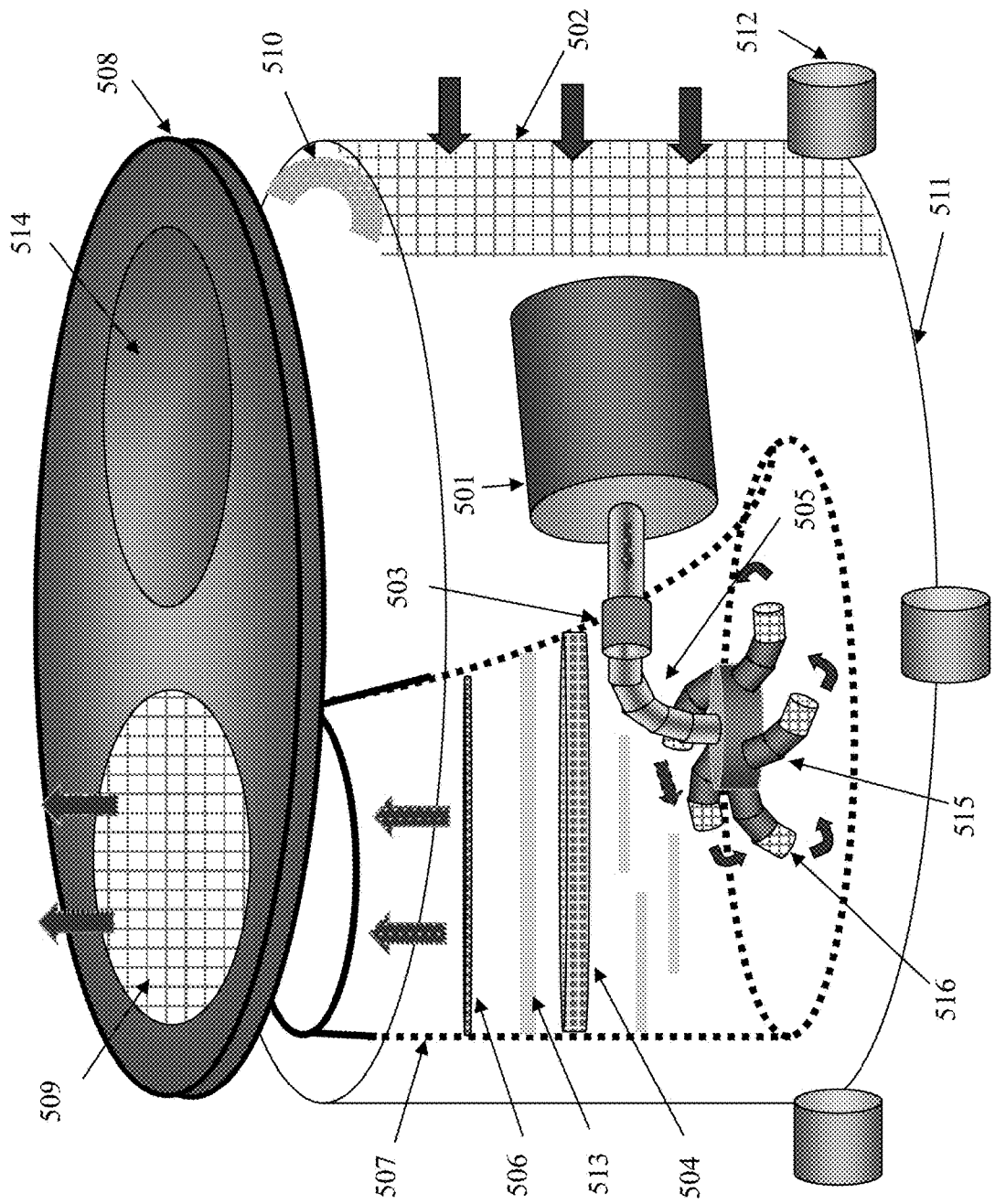
Fig.5 Air Bath Single Incoming Air Source System 500

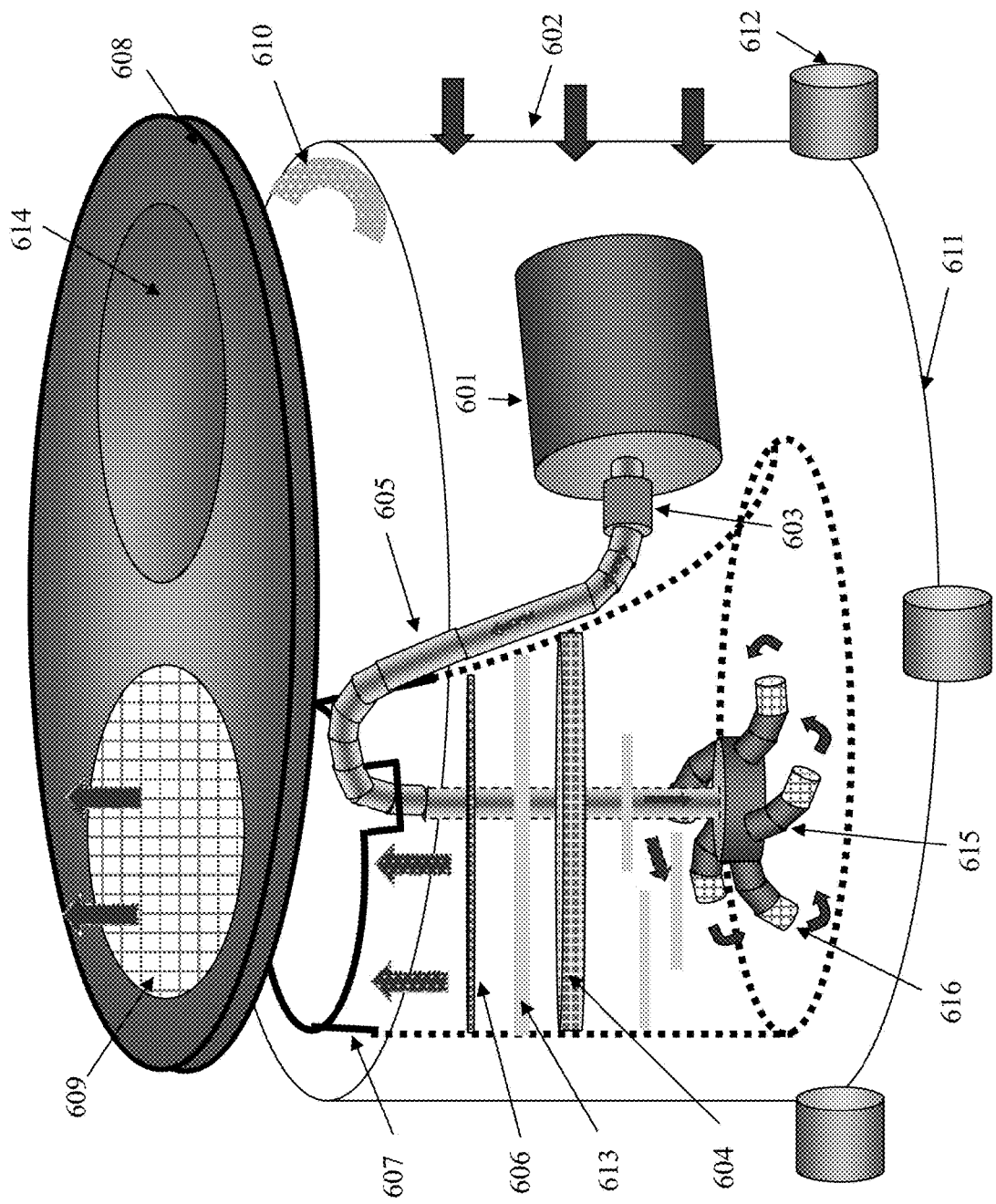
Fig.6. Air Bath Single Incoming Air Source System 600

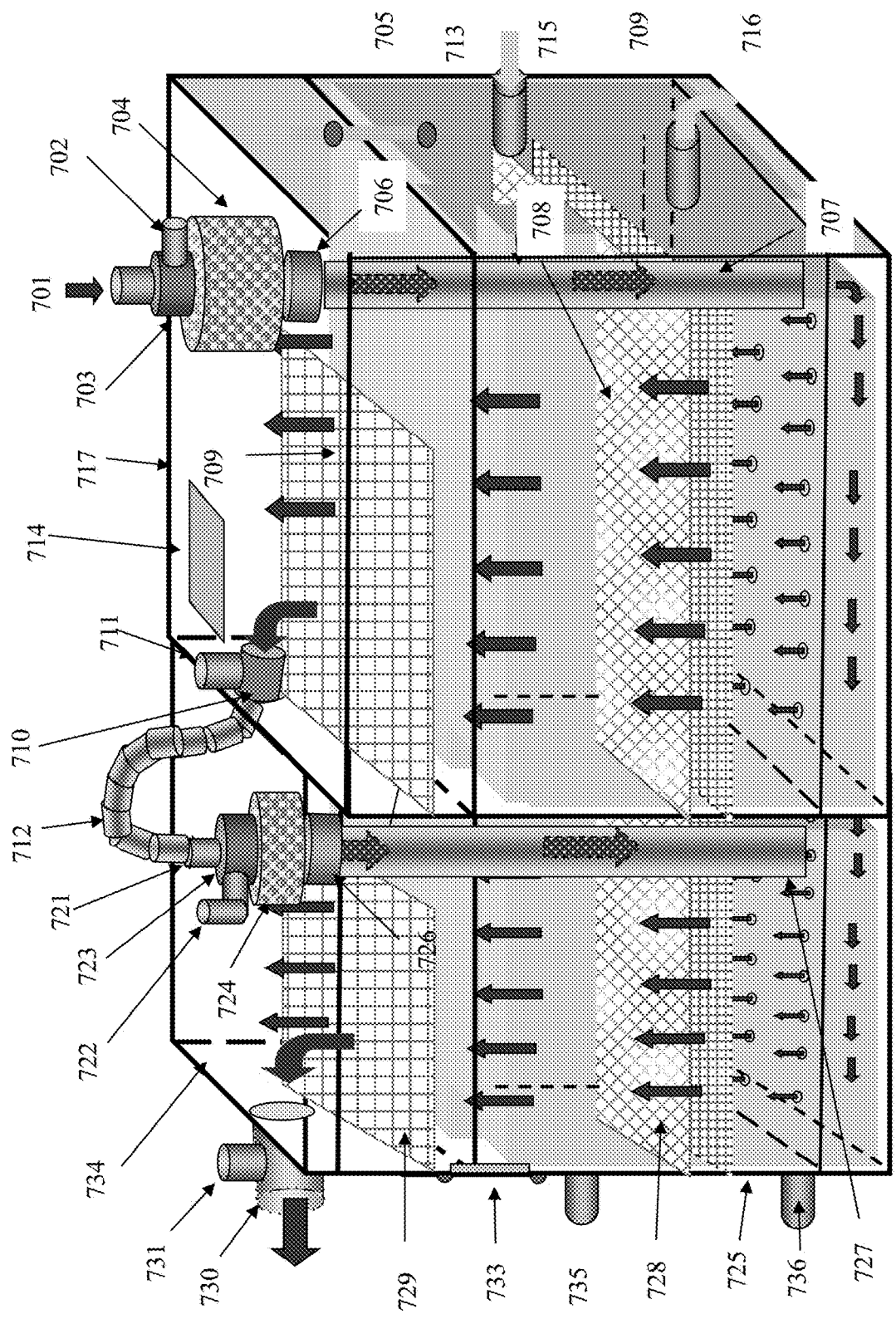
Fig. 7. Air Bath Multiple Stage System 700

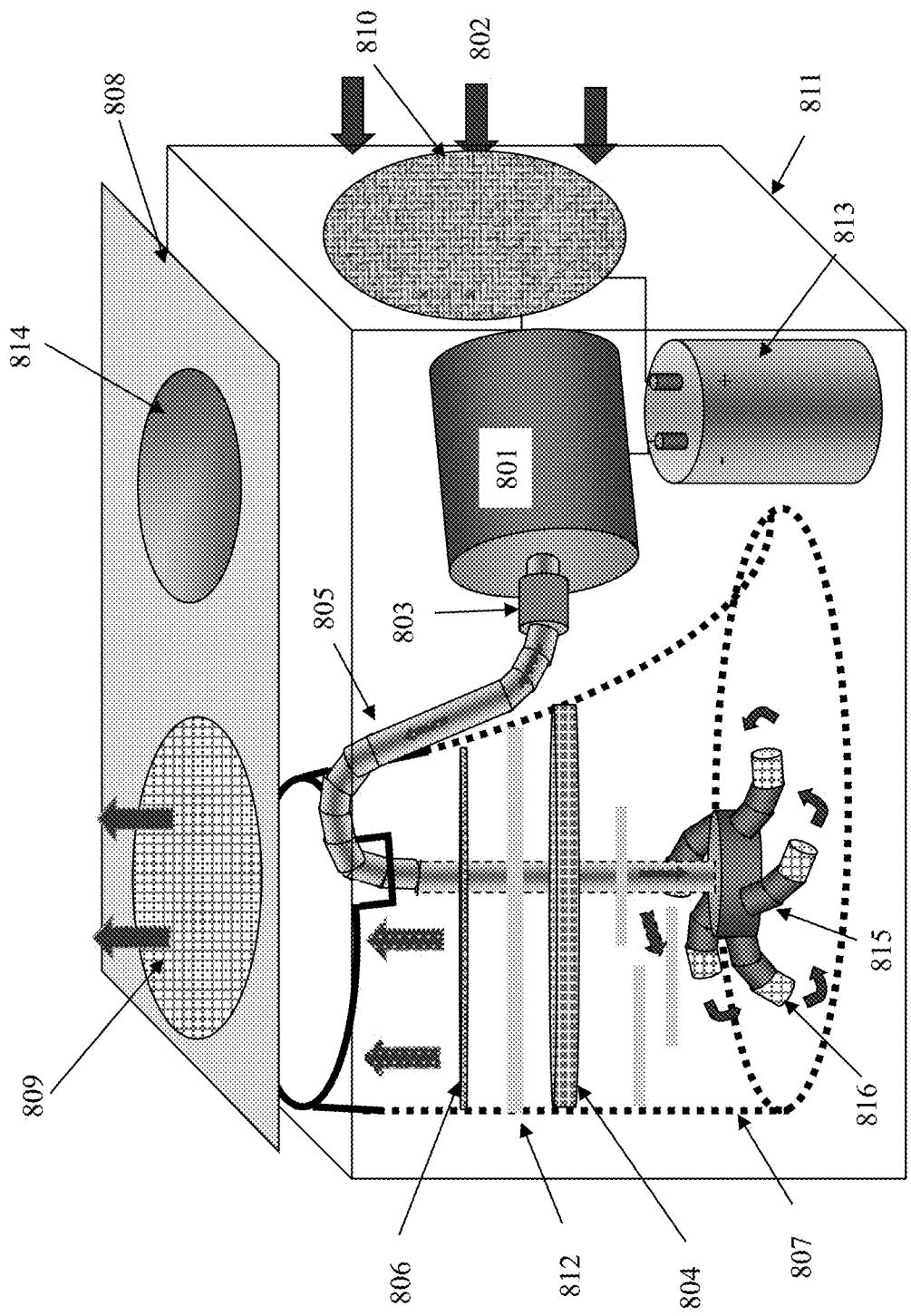
Fig. 8A. Air Bath Portable System 800

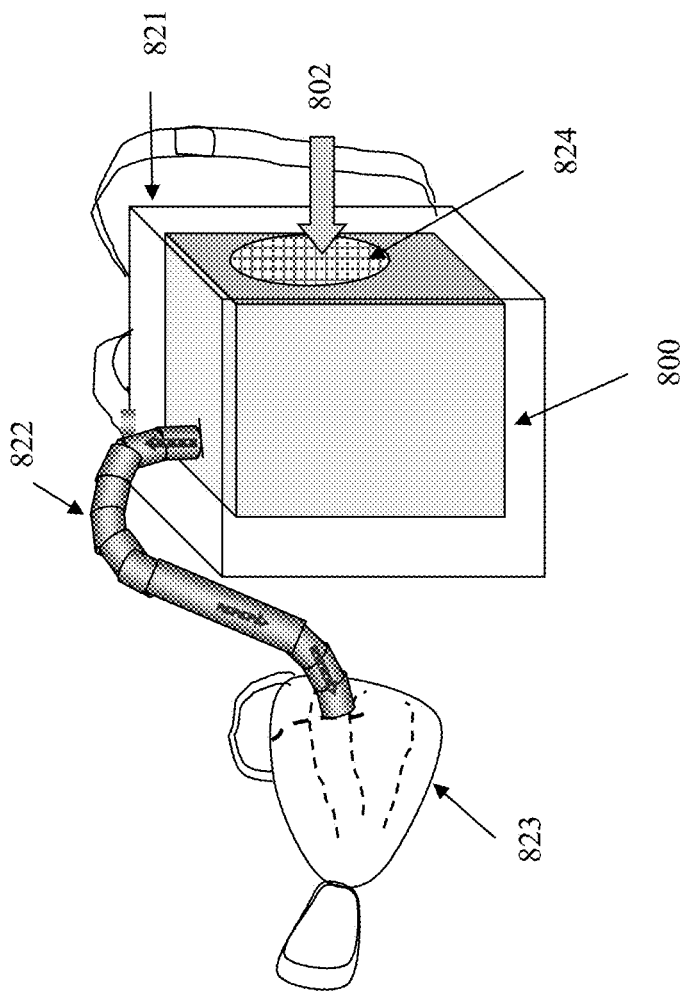
Fig. 8B. Mask and Portable backpack for Air Bath Portable System 820

AIR PURIFICATION METHODOLOGY AND APPARATUS

STATEMENT REGARDING PRIOR DISCLOSURE BY THE INVENTOR

This Application claims benefit of application 62/388,247 filed Jan. 27, 2016.

CROSS-REFERENCE TO RELATED APPLICATIONS

N/A

STATEMENT REGARDING FEDERALLY SPONSORED RESEARCH OR DEVELOPMENT

No any federal support or funding regarding the invention.

BACKGROUND OF THE INVENTION

1. Field of the Invention

This disclosure links to the field of air purification and cleaning polluted air to become safely breathable. In particular the methodology and the apparatus relates to use liquids and air bubble crush system as the filtration medium for airborne debris, water or liquid solvable gases and molecules such as methanol, sulfur dioxide or other harmful gases.

2. Description of the Related Art

With global industrialization and increase of human activities, air quality deteriorates in many cities around world with frequent dangerous foggy weather. In many places around the world, merit of figure of air quality PM2.5 values exceeds dangerously the human's bearable safety limits. Notably, the foggy weather is formed with tiny airborne particles mixed with exhausted gases from vehicles, house heating, wasted gases released from industrial activities. Such contaminant air condition has resulted in clinical consequences such as allergies, respiratory infections, asthma, lung diseases, cancers etc. In many places, harmful gaseous materials or airborne debris have been released or leaked to open air without optimally effective cleaning treatment, particularly in chemical plants. In addition, there are hazardous threats from dangerous contaminants such as airborne spread virus, bacteria, biological disasters, industrial chemical leaks or even possible dirty bomb attacks from terrorists. It is urgent to create a type of high efficiency, high throughput air purification methodology and apparatuses to help people to handle the polluted air and to make the air safely breathable.

Known prior art includes U.S. Pat. Nos. 7,811,537; 6,761,756; 6,036,755; 6,000,557; 3,672,126; 5,509,946 and 5,389,120. While these apparatuses fulfill their respective, particular tasks and requirement, they are not disclosed the new type of high efficiency, high throughput air purification methodology and apparatus.

The numerous traditional air purification methods and apparatuses have used three types of air purification apparatuses, porous materials, electric static or water related. The porous materials ones have fulfilled their works but cannot treat particles smaller than the size of filter pores which leads to secondary pollution, for such small particles, or virus could penetrate into human's cell membranes causing serious illness. The filter itself is logistical headache and it deteriorates over time leading to poor filtration or malfunctions. The electrical static ones would generate unhealthy ozone gas posing danger to human health and its efficiency deteriorates over the time. They are costly, wasteful and harmful due to creation of secondary pollutions. In such air filtration apparatus, secondary pollutions are common place where particles smaller than filter pore sizes have been released with "purified air". Such smaller particles known as PM2.5 are particularly dangerous to human health. The later ones have ranged from spread of water mist, air water surface contact to rush through narrow turbines with water, which yield low efficiency or small throughput and are costly and wastefully. Therefore these apparatus are not suitable to purify the biological and chemical pollutes from domestic air space to industrial environment, public building such as hospital, theatres or transportation tools as air plane, ships, trains or vehicles etc.

Our approach is innovative, and is to create a constantly high efficiency, high throughput air purification apparatus without filter deterioration over-time and no limitation of debris sizes, which is ideal for PM2.5 removal. The apparatus could be automatically or remotely controlled. In case of water being used as a part of filter medium, the apparatus can trap any sizes of airborne particles, dissolve most of water solvable wasted gases and serve as a humidifier at same time to help reduce further airborne debris.

BRIEF SUMMARY OF THE INVENTION

The principle of the invention is to transport large volume of air through a filtration medium consisted of multi-stages of air bubble crushing structures submerged in a body of liquid where incoming air bubbles being repeatedly crushed into smaller and smaller bubbles and prolong air bubble travel time in the liquid to maximize air-liquid contact area in order to trap any sizes of airborne debris and dissolve most of dissolvable gases into the liquid. The system generally contains two parts:

1) Air delivery and distribution system comes with centralized and decentralized forms.

2) Air bubble crush system containing a series of designed grid sizes of mesh screens spaced in certain ways to slice air bubbles into smaller ones repeatedly. Through this process, large air bubbles are crushed repeatedly into smaller ones so that the tiny air bubbles are in close contact with the liquid to wash off debris or trap gaseous molecules, then they are regrouped into new larger bubbles during travel, crushed and washed again. This process repeated numerous times, eventually most if not all air bubbles are washed where debris and most of undesirable gases were trapped or dissolved in the liquid. The purpose of the process is to achieve goal of high efficient and high throughput air bath, incoming air being washed in the liquid to remove any sizes of debris and to dissolve most of undesirable gases in the liquid. It can even handle inflammable gases in special designs.

With the invention of effective air filtration medium made of air bubble crushing structures combined with liquid, the invented apparatus provides a constantly high efficiency, high throughput air purification tool capable of removal debris regardless of their sizes and of dissolving or trapping undesirable gases, without risk of secondary contamination. In case of water being used as a part of filtration medium, the apparatus is particularly suitable for PM2.5 particles removal, dangerous biological agent elimination and harmful gases filtration. It can trap any sizes of airborne particles;

resolve most of water solvable gases such as methane, sulfur, monoxide and carbon dioxide etc. and serves as a humidifier at same time to help reduce further airborne debris. With addition of bleach, it can kill in-situ airborne viruses, bacteria or any biological agents during air purification. In contrast with conventional air filtration apparatus with UV lights which are generally not effective to eliminate biohazard agents in the air during filtration. Because sufficient radiation time is needed to kill those biohazard agents. A liquid water or chiller can be deployed to achieve desirable out going air temperature.

The apparatus can be used in portable, indoor, outdoor, public space, hospitals, transportation tools or industrial platforms. For example, indoor platform apparatus uses indoor air as incoming air source to clean. Outdoor platform apparatus can use outdoor air or indoor air as incoming air source to clean with a selection switch.

BRIEF DESCRIPTION OF THE DRAWINGS

These features and their advantages will be better understood through reading of the following detailed description together with the drawing within:

FIG. 1A. Schematic drawing of multiple air sources air-bath air purification system 100 with vertical multi-stage air bubble crush system consistent with the present disclosure.

FIG. 1B. Housing of the multiple air sources air-bath air purification system 100.

FIG. 2. Schematic drawing of illustration of the air bubble crushing system 108.

a. Porous material slab 201.

b. Series of mesh screen stack system 202.

c. Random fine wire stuffed system 203.

FIG. 3A. Schematic drawing of centralized multi-sources air delivery and distribution structure 300.

FIG. 3B. Schematic drawing of decentralized multi-sources air delivery and distribution structure 320 with air chamber 326.

FIG. 3C. Schematic drawing of cyclone air delivery and distribution structure 340.

a. Perspective view of the cyclone air delivery and distribution structure 340.

b. Top view of the cyclone air delivery and distribution structure 346 showing movement effects of the crushed air bubbles.

FIG. 4A. Schematic drawing of multiple air sources air-bath purification system 400 with cyclone and multi-stages air bubble crush structures consistent with the present disclosure.

FIG. 4B. Housing of the multiple air sources air-bath purification system 400.

FIG. 5. Schematic drawing of single air source air-bath purification system 500 with cyclone air delivery, distribution and multi-stage air bubble crush system consistent with the present disclosure.

FIG. 6. Schematic drawing of single air source air-bath purification system 600 with cyclone air delivery, distribution and multi-stage air bubble crush system consistent with the present disclosure.

FIG. 7. Schematic drawing of multiple air sources air-bath purification multi-stage system 700 consistent with the present disclosure.

FIG. 8A. Schematic drawing of a portable air-bath air purification system 800 with multi-stage air bubble crush system consistent with the present disclosure.

FIG. 8B. Schematic drawing of mask and backpack housing 820 for the portable air-bath air purification system 800 consistent with the present disclosure.

DETAILED DESCRIPTION OF THE INVENTION

An air purification apparatus consists of embodiment of the present disclosure, purifying air with liquid (and humidifying the air simultaneously when water used as a part of filtration medium), then the cleaned air being delivered to the environment or designated space. The air purification apparatus is designed to provide a constant high efficiency, high throughput air purification without limitation of debris sizes, capable of dissolving, trapping certain gaseous molecules. As used herein, the term "washed air", "filtered air" or "air bath" refers to air at least some portions of debris or contamination removed from the air, regardless the sizes of the debris. The term "purify" or "purified" refers to removal of at least certain portions of debris or contamination from the air, not required to remove all contamination or debris. Similarly the term of "moisturizer", or "humidifier" refers to increase at least some degree of humidity to the air. The term "crush", "crushed" or "crushing" refers to reduce air bubble sizes into smaller air bubbles.

The apparatus has multiple designs including single air source, multiple air sources, multiple stages and portable platforms following the same innovative principles.

Referring FIG. 1A. The multiple air sources air-bath apparatus 100 generally consisted of at least: a blower motor with checking valve 101 to suck air from incoming air sources 103 or 104, a damper switch 102 to choose incoming air from either source A 103 or from source B 104, an filtered air outlet port 105 to release filtered air, a splash damper 106 to minimize splash and control humidity, a liquid inlet auto-valve 107 to replenish or refill liquid, an air bubble crushing system 108 as a part of filtration system, an incoming air distribution unit 109 having an air chamber on which there are many small holes to produce air bubbles, a liquid level sensor 110 to monitor the liquid level 111 where the liquid served as a part of filtration medium, a blower to air distribution system connection 112, a liquid drain auto valve 113 and a liquid container 114. All elements in apparatus 100 can have multiple units with the same or different shapes, forms or sizes with similar functionalities, such as one or more blower motors 101 can be used in the apparatus depending on the throughput requirement.

Referring FIG. 1B. A case 117 houses the apparatus 100 including, at least a coarse primary dry filter 116 for air passages 103 or 104, and a controller board 115. The case 117 can be any shapes or sizes in a manner to suit application needs and is designed to prevent leak of the liquid. The controller 115 consists of at least an electrical circuit board 115 including display, GFCI safety interlock, logic board to monitor liquid level, control valves and to maintain operations, and a remote control unit. The controller 115 can equip PM2.5 meters to serve as monitor or as a part of automation control. The case can have wheels depending on needs.

Referring FIG. 2. Air crushing system 108 consist of a body of liquid with its surface 111 (FIG. 1A), a combination of porous materials 201 (FIG. 2.*a*), a stacked of mesh screen materials 202 with different grid sizes and they are separated each other with designed distances (FIG. 2.*b*) and a random wire stack system 203 (FIG. 2.*c*), all submerged under the liquid surface 111 (FIG. 1A). The stack of mesh screen material sets with different grid sizes and spaced in certain distances between them designed to optimize travel lengths of small air bubbles. When incoming air passing through the air crushing system 108, air bubbles are repeatedly crushed into smaller ones then recombined to larger ones and being crushed again to maximize air-liquid contact surfaces. The purpose is to ensure the incoming air thoroughly washed by the liquid to trap any sizes of debris and to leave certain gaseous molecules sufficient time to contact with the liquid so they will be dissolved, absorbed or trapped in the liquid. The crushing system can be made with any combinations or forms of numbers of porous materials 201, mesh screen materials set 202 each having certain grid sizes and spacing between them, and random wire stack systems. The design guideline is to balance highest air throughput with best air wash quality and efficiency.

Referring FIG. 1 and FIG. 2, one embodiment of a multiple air sources air-bath apparatus 100 is shown and described in great details. Although a specific embodiment is shown and described, other embodiments of air-bath apparatus as described generally above are within the scope of the present disclosure and claims. Each of the components of air-bath apparatuses described above and below may be varied within the scope of the present disclosure and claims.

As shown in FIG. 1 and FIG. 2, a pre-filtered air drawn by the multiple air sources air-bath apparatus 100 through a coarse pre-filter 116, passing a damper switch 102 to select air sources from 103 or 104. The incoming air then are injected through an incoming air distribution unit 109 to the lower part of a container 114 which filled liquid to certain level so that the air crushing system 108 submerged completely under certain distance below the liquid surface 111. When the injected air escaped air distribution unit 109 in forms of different sizes of air bubbles which then being crushed to smaller and smaller bubbles repeatedly when passing through different stages of air crushing system 108. The repeated air bubble crushing processes through 108 maximize the injected air to liquid contact surfaces and travel time to achieve air-wash purpose, where debris and certain gaseous molecules can be dissolved or trapped in the liquid. The purified air escaped from liquid surface 111 will meet the splash damper 106 to minimize splash before released to designated place through air outlet port 105.

Automation can be added through using of PM2.5 meter and internal built logics to operate. The liquid can be maintained full automatically by using designed logics, the liquid level sensor and auto valves to replenish, wash, dump and refill new liquids. Safety interlock is achieved using GFCI switch. The apparatus can be remotely controlled through various ways such as infrared, blue-tooth, mobile phones or home automations etc. The automation scheme described above can be applied to any embodiments of the invention.

Referring FIG. 3A. Centralized air distribution system 300 consists of at least, an air blower 301 with checking valve, an incoming air selection switch 302, incoming air sources 303 and 304, a blower to air distribution connection 305 and an air directional guiding bowl 306. The air guiding bowl 306 can be designed such to facilitate air re-direction and to produce air bubbles.

Referring FIG. 3B. Decentralized air distribution system 320 consists of at least, multiple incoming air sources 323 or 324, an air blower 321, a damper switch 322, a blower to air distribution connection 325 and an air distribution unit with air chamber 326. The air chamber compartment is designed to have a set of small holes distributed on the top of air chamber to guide incoming air and to divide them into small bubbles.

Referring FIG. 3C.

a. Cyclone air distribution system 340 consists of at least, a blower to air distribution connection 341, an air distribution chamber 342, a cyclone air distribution system outlets 343 and air bubble crushing caps 344. The air chamber compartment is designed to have a set of outlets to guide incoming air to form an air bubble cyclone movement in liquid, which will extend air bubbles travel time in the liquid and thus to increase contact time between air bubbles and liquid, achieving higher air filtering efficiency. The cyclone movement of liquid will facilitate the deposition of debris to the bottom of container. The cyclone air distribution system is designed to have spiral distribution structure connected by tubular bodies with smooth bent angles leaning slightly down towards bottom of container to facilitate deposition of debris and to minimize air resistance.

b. Cyclone air distribution system 340 top view and illustration of air bubble circulation 345. Note that it's only an exemplary illustration of the air bubble movement which can be clockwise or counter clockwise.

Referring FIG. 4A. A multiple air sources air-bath apparatus 400 with cyclone air distribution system generally consisted of at least: a blower motor with checking valve 401 to draw air, a damper switch 402 to choose incoming air either from source A 403 or source B 404, an filtered air outlet port 405 to release filtered air to designated area, a splash damper 406 to minimize liquid splash and control humidity of the released air, a liquid inlet auto-valve 407 to replenish or refill liquid, an air crushing system 408 as a part of filter system with combinations of porous material slab 201 (in FIG. 2), a stack of mesh screens 202 (in FIG. 2) with designed grid sizes and spaced each other in certain distances with air bubble crushing caps 416 (made of 203 in FIG. 2), an incoming air cyclone distribution unit 409, a liquid level sensor 410 to monitor the liquid level 411 where the liquid served as a part of filtration medium, a blower to air distribution system connection 412, a liquid drain auto-valve 413, a container 414, an apparatus's cover 415. All elements in apparatus 400 can have multiple units with the same or different shapes, forms or sizes with similar functionalities, Such as one or more blower motors 401 can be used in the apparatus depending on the throughput requirement and application needs.

Referring FIG. 4B. A case 418 contains the apparatus 400 including, at least a coarse primary dry filter 417 for air passages 403 or 404, out going air release port 405 and a controller and display board 419. The case 418 can be any shapes or sizes in a manner to suit application needs and is designed to prevent leak of the liquid. The controller 419 consists of at least an electrical circuit board including display, GFCI safety interlock, logic board to monitor liquid level, control valves and to maintain operations, and a remote control unit. The controller 419 can equip PM2.5 meters to serve as monitor and as a part of full automation control. The case can have wheels depending on needs.

In the example embodiment 400, shown in FIGS. 4A and 4B, a pre-filtered air drawn by an air blower with checking valve 401 through a coarse pre-filter 416 where large size debris are blocked, passing a damper switch 402 to select air sources from 403 or 404. The incoming air then are injected through a blower to air distribution connection 412 passing an air cyclone distribution unit 409 to lower part of container 414 which filled liquid to certain level 411 so that the air crushing system 408 is submerged completely in the liquid. The injected air from cyclone air distribution unit 409 crushed by air crushing caps 416 (shown also in FIG. 2c) into small bubbles then circling in the liquid before being crushed further by the crushing stack system 408 which can be combinations of a series of porous material slabs and stack of mesh screens with certain grid sizes and spacing (also shown in FIG. 2a, 2b). The different stages of air crushing structures divide air bubbles into even smaller bubbles. The repeated air bubble crushing and recombining processes through 408 maximize the injected air to liquid contact surfaces and air bubble travel time in liquid to achieve better air-wash efficiency, where certain portion of debris or gaseous molecules can be trapped, dissolved or absorbed in the liquid. The filtered air escaped from liquid surface 411 will meet the splash damper 406 to minimize liquid splash and to control air humidity before released to designated space through air outlet 405. The example embodiment 400 can be fully automated through a controller 416, in which PM2.5 meters can be used with designed logics based on the incoming air quality to automatically operate, control the liquid level, refill or replace liquid through auto-valves 407, 413 using liquid level sensor 410 based on the cleanness of the liquid. The apparatus can be also remotely operated through wireless signals such as infrared, Bluetooth, mobile phone or other forms of signals.

As shown in FIG. 5, an example embodiment of air bath system 500, includes at least, an apparatus case 511, incoming air grids, incoming air primary filter 510, wheels 512, top apparatus cover 508 where locates air outlet net 509, electronic display and controller board 514, a container 507 holding a body of liquid to the liquid surface level 513, a splash damper 506, a blower motor with checking valve 501, a liquid checking valve 503 to prevent liquid back flow to cause electrical shorts, a blower to cyclone air distribution connection 505, a combination of random wire stack system and mesh screens stack air crushing system 504. When incoming air drawn from incoming air net 502 and passing through a primary coarse filter 510, then the air is injected through the checking valve 503 passing connection 505 to the cyclone air distribution system 515. The injected air is crushed into many small bubbles through the random wire stack caps 516, which creates a cyclone movement in the lower part of the liquid container 507. Then the air bubbles in the cyclone movement are crushed further into smaller air bubbles through mesh screens crushing system 504 to achieve optimum air bath effect. The filtered air eventually will meet the splash damper 506 before released to designated space through air outlet net 509. The embodiment of air bath system 500 can be operated automatically with its controller board 514 where PM2.5 meter being used as an indicator to trigger the apparatus.

Referring FIG. 6, an example embodiment of air bath system 600, it is very similar to the example embodiment of air bath system 500. Except having a blower to cyclone air distribution connection 605, it has an elbow passing from the top of the liquid container 607. The advantage of such arrangement is to minimize risk of possible leak from joint connection of checking valve 503 with liquid container 507. The apparatus 600 includes at least, an apparatus case 611, incoming air grids 602, incoming air coarse filter 610, wheels 612, top apparatus cover 608 where locates air outlet net 609, electronic display and controller board 614, a container 607 holding a body of liquid to the liquid surface level 613, a splash damper 606, a blower motor with checking valve 601, a liquid checking valve 603 to prevent liquid back flow to cause electrical shorts, a blower to cyclone air distribution connection 605, a combination of random wire stack system caps 615 and a mesh screens stack crushing system 604. When incoming air drawn from the incoming air net 602 and passing the primary coarse filter 610, then the air is injected through the checking valve 603 passing connection 605 to the cyclone air distribution system 615. The injected air is crushed to many small air bubbles through the random wire stack caps 616, which create a cyclone movement in the lower part of the liquid container 607. The air bubbles in the cyclone movement are crushed further into smaller air bubbles through mesh screens stack system 604 to achieve optimum air bath effect. The filtered air will then meet the splash damper 606 before released to designated space through air outlet net 609. The embodiment of air bath system 600 can be operated automatically with its controller board 614.

As shown in FIG. 7, an example embodiment of air bath multiple stages system 700, for first stage regardless linked in series or in parallel mode, includes at least, a pre-filtered incoming air source 701 or 702, an air source selection switch 703, an air blower motor 704, a liquid container 705, a checking valve 706, a blower to air distribution system connection 707, an air crushing system 708, a splash damper 709, a stage switch 710, a released air outlet 711, a stage connection 712, a liquid level sensor 713 and a controller board 714 containing display, a liquid inlet auto valve 715, a liquid drain auto valve 716 and a top cover 717.

For second stage or so on, regardless linked in series or in parallel mode, includes at least, a pre-filtered incoming air sources 721 from prior stage and air source 722, an air source selection switch 723, an air blower motor 724, a liquid container 725, a checking valve 726, a blower to air distribution system connection 727, an air crushing system 728, a splash damper 729, a stage switch 730, a released air outlet 731, a stage connection 732 and a liquid level sensor 733, a liquid inlet auto valve 735, a liquid drain auto valve 736 and a top cover 734.

The elements from 701 to 717 in the first stage are similar comparing to the second stage from 721 to 736. The stage switches 710 and 723 and so on are used for operation selection as single, parallel or in series mode. When in series mode, stage switch 710 connects to second stage air source 721 through the switch 723, filtered air from first stage will be injected into second stage as incoming air source. When in parallel mode, stage switch 710 connects to the air outlet port 711 and switch 723 connects to the air source 722.

Multiple stages in series are designed for ultra-high quality of air purification. The first stage is same as described above. The purified air from the first stage will be injected through stage connection 712 as the air source 721 of second stage. The injected air will then be washed again in the second stage with similar or different design as the first stage to ensure most of debris, bacteria, virus or any other dangerous species being trapped or eliminated during the cleaning. For example, in the first stages bleach can be added into water as part of cleaning medium where bacteria, virus or any other dangerous biological species can be eliminated, then the released air are injected into second stage for further purification. If not sufficient, more stages can be integrated to eliminate completely the contaminants. Such design is particularly suitable to biohazard or chemically dangerous environment.

Parallel linked design can be used for large scale applications where more throughputs needed. This means that multiple such air purification apparatuses can be operated in parallel to increase air throughput.

The liquid can be mixture of water with any desired additions to achieve designed goals, such as bleach, chemical agents, fruit aroma or simply home refresher such as flower fragrance, perfume etc., based on needs of the applications. It could be also other liquid form of chemicals depending on application needs.

Referring FIG. 8A and FIG. 8B, an example embodiment of portable air bath system 800 is shown, which is quite similar to the example embodiment of air bath system 400 where the system 800 has been hosted in a portable case or backpack bag 820. The system 800 includes, at least, an air blower motor with checking valve 801, an air net 802 with replaceable coarse filter 810, a liquid checking valve 803, an air crush system 804, air bubble crush caps 816, a blower to cyclone air distribution system connection 805, the cyclone air distribution system 815 having spiral distribution connected by tubular bodies with smooth bent angle to minimize air resistance, a splash damper 806, a liquid tank 807, an apparatus cover 808 located purified air outlet port 809 and control panel 814 with display, powered by battery or other power sources 813, a liquid level sensor 812 and an apparatus body 811.

The system 820 includes, backpack bag or portable case 821, a flexible tubular pipe 822 connected to the purified air discharge port 809 to a mask 823 and an air net opening 824 for incoming air net 802.

When the apparatus powered on, incoming air is drawn through the air net 802 and the filter 810 by the blower motor 801, the air then being injected through the tubular (manifold) pipe into the spiral air distribution system. The injected air is crushed into many small bubbles through the random wire stack caps 816, which create a cyclone movement in the lower part of the liquid container 807, where certain portion of debris are pushed downward to the bottom of the tank 807 due to cyclone air/liquid movement. Then the air bubbles in the cyclone movement are crushed further into smaller air bubbles through mesh screens crushing system 804 to get optimum air purification. The purified air is released through the moisture damper 806 to minimize the splash and to reduce moisture content, then passes through the release port 809, flexible tube 822 reaching mask 823.

For certain applications, liquid container can be an easy dismountable for replacement of liquid and cleaning purposes.

While the principles of the invention have been described herein, it is to be understood by those skilled in that art in this description is made only by way of example and not as a limitation as to the scope of the invention. Other embodiments are contemplated within the scope of the present invention in addition to the exemplary embodiments shown and described herein. Modification and substitutions by one of ordinary skills in the art are considered to be within the scope of the present invention, which is not to be limited except by the following claims.

What is claimed is:

1. An air purification apparatus, comprising: a water tank to hold water;
    a first stage air bubble size reduction module integrated with a bottom of the water tank and designed to reduce air bubble sizes of air entering to the water held in the water tank;
    an electrical blower coupled to the first stage air bubble size reduction module and configured to inject the air into the water tank starting with reduced air bubble sizes; and
    a second stage air bubble size reduction module disposed in said water tank to further reduce the air bubble sizes of the air in the water inside of the water tank.

2. The air purification apparatus of claim 1, further comprising a third stage air bubble size reduction module disposed within said water tank located between the second air bubble size reduction module and the first stage air bubble size reduction module wherein said third stage air bubble size reduction module crushes and reduces the air bubble sizes of the air contained in said water tank.

3. The air purification apparatus of claim 1, wherein the first stage air bubble size reduction module includes a hollow chamber having a top plate; and the top plate comprising a plurality of openings for introducing air from said electrical blower to form air bubbles.

4. The air purification apparatus of claim 3, wherein the hollow chamber is connected to the electrical blower through a pipe configured inside the water tank.

5. The air purification apparatus of claim 3, wherein the hollow chamber includes a bottom plate as a common bottom plate of the water tank.

6. The air purification apparatus of claim 3, wherein the openings in the top plate comprising different sized openings.

7. The air purification apparatus of claim 1, wherein said first stage air bubble size reduction module comprising a spiral pipe structure with multiple spiral-curved pipes, wherein each pipes comprising a plurality of openings with same or different sized openings.

8. The air purification apparatus of claim 1, wherein said first stage air bubble size reduction module includes a linking pipe array comprising multiple pipes where each of said pipes include a plurality of the same size or varied sized openings on the surface of said pipes.

9. The air purification apparatus of claim 1, further comprising a meshed plate integrated on top of the water tank, located above the water level surface, wherein said meshed plate comprises openings for the air to escape from said water tank and for catching water droplets splashed from said water tank.

10. The air purification apparatus of claim 9, wherein the water tank further includes a water inlet located lower than said integrated plate.

11. The air purification apparatus of claim 1, wherein said second stage air bubble size reduction module comprises a horizontally disposed plate comprising a plurality of the same size or different sized openings.

12. An air purification apparatus, comprising: a water tank to hold water;
    a first stage air bubble size reduction module integrated with a bottom of the water tank and designed to reduce air bubble sizes of air entering to the water held in the water tank;
    an electrical blower coupled to the first stage air bubble size reduction module and configured to inject the air into the water tank starting with reduced air bubble sizes; and
    a second stage air bubble size reduction module submerged within said water tank to reduce the air bubble sizes of the air; and wherein the first stage air bubble size reduction module includes a crushing structure selected from the group consisting of a hollow chamber with a top plate, a spiral pipe structure including a plurality of spiral pipes and a linking pipe array including a plurality of linking pipes; wherein said crushing structure comprise a plurality of openings.

13. The air purification apparatus of claim 12, further comprising a third stage air bubble size reduction module disposed within said water tank located between the second air bubble size reduction module and first stage air bubble size reduction module wherein said third stage air bubble size reduction module further reduces the air bubble sizes of the air contained in said water tank.

14. The air purification apparatus of claim 12, wherein the openings are varied sized or the same size.

15. The air purification apparatus of claim 12, further comprising a mesh plate integrated with the top of the water tank at a slight angle to permit air to escape from said water tank and to capture water drops from said water tank.

16. The air purification apparatus of claim 12, further comprising an air outlet located above said meshed plate and further comprising a solid plate cover said water tank.

17. The air purification apparatus of claim 12, wherein said water tank further comprises a water inlet configured within said water tank below said meshed plate.

18. A method for air purification, comprising the steps of:
(a) filling a tank with water through a water inlet;
(b) driving air, by an electrical air blower, into a first stage air bubble size reduction module integrated at a bottom of said tank;
(c) injecting the air into the water through a plurality of openings of the first stage air bubble size reduction module, thereby generating small air bubbles injecting into the water to increase water-air contact surface to capture contaminants in the air while being passed through the water tank;
(d) reducing and crushing the air bubbles sizes further of the air contained in said water tank by a second stage of air bubble size reduction module submerged within said water tank to capture remaining contaminants in the air while being passed through said water tank;
(e) reducing and crushing the air bubbles sizes of the air contained in said water tank by a third stage of air bubble size reduction module disposed within said water tank located between the second air bubble size reduction module and the first stage air bubble size reduction module to increase water-air contact surface to capture contaminants in the air while being passed through said water tank.

* * * * *